UNITED STATES PATENT OFFICE.

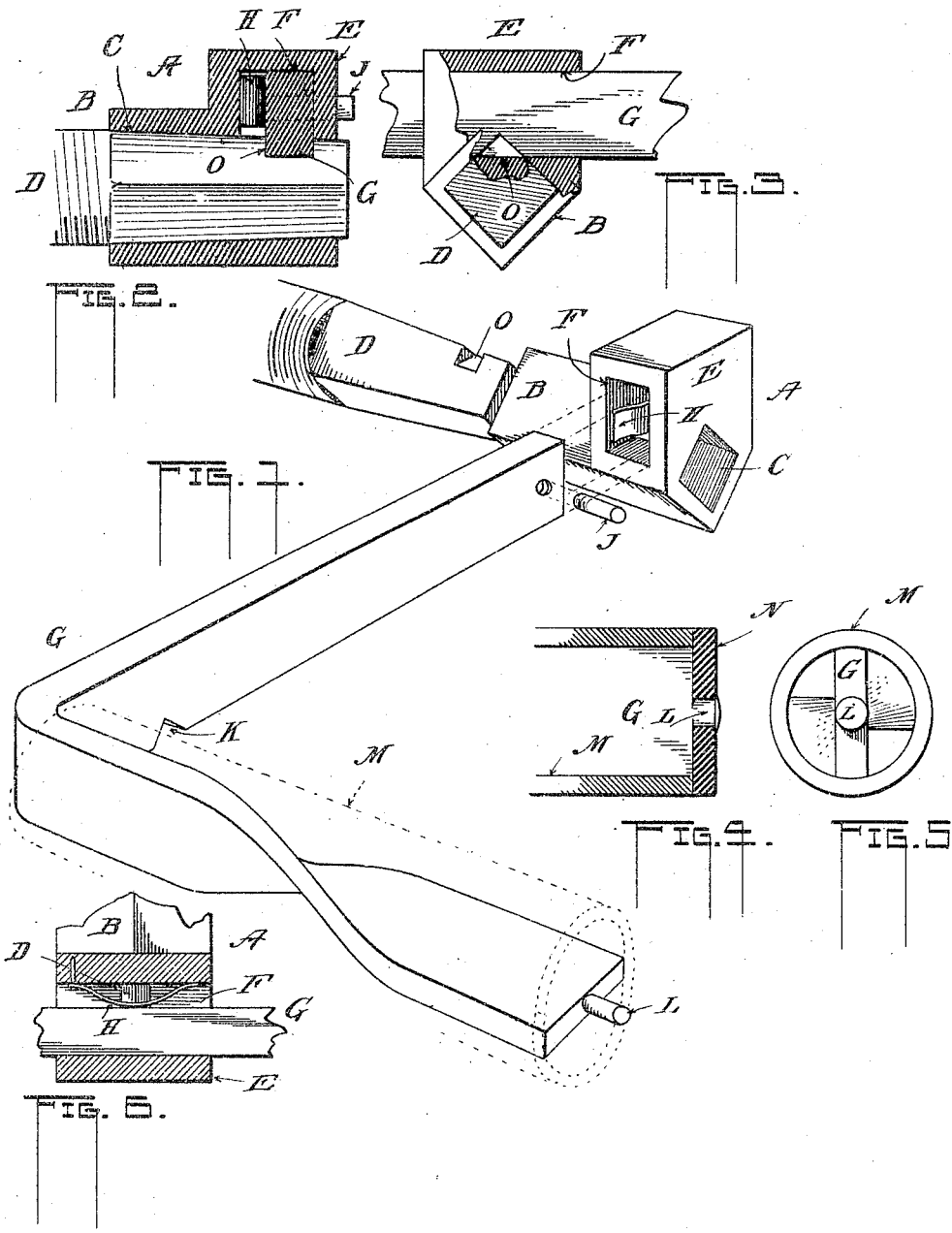

WILLIAM H. CLARKSON, OF EDWARDS STATION, ILLINOIS, ASSIGNOR TO ELIUD J. CLARKSON, OF EDWARDS STATION, ILLINOIS.

ADJUSTABLE HANDLE FOR TOOLS.

1,049,455.  Specification of Letters Patent.  Patented Jan. 7, 1913.

Application filed January 3, 1910. Serial No. 536,139.

*To all whom it may concern:*

Be it known that I, WILLIAM H. CLARKSON, citizen of the United States, residing at Edwards Station, in the county of Peoria and State of Illinois, have invented certain new and useful Improvements in Adjustable Handles and Tools; and I do hereby declare that the following is a full, clear, and exact description of the invention, which will enable others skilled in the art to which it appertains to make and use the same.

This invention relates to a device for driving rotatable machine elements and pertains more particularly to a crank for positive connection with a rotatable tool.

One of the objects of the invention is to provide a crank for a rotatable element that when in use cannot become readily detached from said element.

Another object is to provide means for securing machine elements in operative relation.

Another object is to provide a crank for a rotatable element that when attached will not become separated except by design of the user and that can be made to positively remain in any desired adjustment.

In the accompanying drawing:—Figure 1 is a perspective view of parts of my invention disassembled. Fig. 2 is a longitudinal section of the parts comprising my invention having the shank of a tool in connection therewith. Fig. 3 is a front elevation with part in cross section. Fig. 4 is a longitudinal section of a tubular handle in part section. Fig. 5 is an end elevation of the same. Fig. 6 is a transverse section of a part of the device shown in Fig. 2.

It is the purpose of my invention to provide a driving crank for tools, or machine elements, which can be readily adjusted in the portion which it is adapted to turn for conveniently obtaining power or speed as may be desired according to the particular kind of work to be done, and at the same time so apply the crank that it will not be likely to become accidentally separated from the said portion.

In the figures, A indicates a casting the larger or body portion B of which is provided with a socket C, preferably one having a taper, or smaller at one end than the other or of a form to receive the tapering shank of a tool D to be driven. Also the socket is made square or of any other desired shape and the said shank is made of a similar form or so that a positive drive will result. The casting has an enlargement E extending at right angles to the longest axis of the body B and has a slot F extending through it at right angles to said longest axis and which intersects the socket C preferably at one of the corners of the latter.

G is a crank-arm adapted to lie within the slot F and is shiftable therein for the purposes to be described presently and in order that said arm may be firmly held in any adjustment I provide a spring for instance as shown at H which may be suitably held in place within the slot F there being sufficient space between one of the walls of the slot and the said arm G to receive it. Sufficient friction is thus provided upon the arm to hold it when adjusted to the desired position. The arm is provided at one extremity with a pin J which may be screw-threaded in order to hold it in place but it may be otherwise secured in said arm and its purpose is to prevent the arm leaving the body B when placed therein. Near the other end of the arm, that engages the tool D, is a V-shaped notch K, which, when carried inside the enlargement E by shifting said arm will register with the socket C as shown in Fig. 3 so that the shank of the tool can be freely inserted or withdrawn and said arm has an integral extension at right angles to it to thus form a crank preferably of one piece said extension being given a quarter turn or twist on itself while its free end is provided with an extending lug or pin L. A tube M to form the handle for the crank, as shown in Figs. 4 and 5, and in broken lines in Fig. 1, is slipped upon the twisted portion which is followed by a washer N Fig. 4 which lies against the end of the tube and receives the lug L. By "upsetting" or riveting the end of the pin or lug the washer and tube are permanently held upon the crank. This gives a very cheap form of structure and at the same time provides one that is perfectly strong it being understood that by providing the twist in the crank as described and shown the tube is held from lateral movement.

The shank of the tool to be driven is provided with a notch for instance as indicated in Fig. 1 at O which is preferably made in one corner of the shank; the socket C of the casting A being so disposed that one of its corners receives the notched corner of the tool in such a position that the crank will enter it and when so entered it is impossible for the tool to be withdrawn.

In order to assemble the parts in driving relation the notch K of the crank is first made to register with the socket C, as in Fig. 3, the tool D is then inserted in its socket with its notch O in position to receive the crank. Then by shifting the crank through the extension E it engages the notch to prevent the tool being withdrawn. The crank extension which engages the enlargement E can be as long as desired so that considerable leverage can be had, for instance when boring in very hard substances where much power is needed. If, however, the work is light it can be done faster and does not require as much leverage in which case the handle of the crank may be moved closer to the axis of the tool D by shifting its extension through the enlargement E as will be understood. The spring H at all times keeps considerable friction upon said crank so that it is properly held even when hanging downward when its own weight would tend to shift it within the slot F.

I have adopted the device described for use for coal drills where different strata of material must be bored through and which differ in density and hardness. When a soft material is encountered the handle of the arm G can be shifted close to the axis of the drill-bar, which is the tool D, and a high speed can be used since less effort is needed to drive the arm. But where a much harder material is met more power is required with a slower speed and when this occurs the handle of the crank is pulled outward or away from the axis of the said drill-bar in order to provide a greater purchase or leverage and while my invention is admirably adapted for this particular purpose it is well adapted also to many others.

Slight changes may be made, of course, in the device such as will suggest themselves and Having described my invention, I claim:

1. The combination with a member, having a shank, a second member provided with an opening to receive the shank, there being a slot in the said second member, there also being a notch in the shank communicating with said slot, an arm extending through the slot and engaging the said notch and slidable therein, and means carried by one of the members to yieldingly and frictionally engage the arm.

2. The combination with a member to be rotated having a notch extending transversely to its axis of rotation, a second member provided with an opening to receive the member and having a slot therein lying parallel to the notch and communicating therewith, an arm lying within the slot and said notch, and a spring lying within the slot and adapted to frictionally and yieldingly engage the arm.

3. The combination with a member to be rotated having a tapered shank said shank having a notch extending transversely to its axis of rotation, a second member having a tapered socket to receive the shank and having a slot therein to communicate with the notch, an arm slidably engaging the slot and notch and adapted thereby to hold the two members in connected relation, and a spring carried by the said second member to frictionally and yieldingly engage the arm.

4. The combination with a member to be rotated, provided with a transverse notch, a second member provided with a socket to receive the first, and also having a transverse slot intersecting the socket and in register with the notch, and an arm slidably adjustable in the slot and said notch.

5. The combination with a member to be rotated, provided with a transverse notch, a second member provided with a socket to receive the first, and also having a transverse slot intersecting the socket and in register with the notch, and an arm slidably adjustable in the slot and said notch, and provided with a notch corresponding with the socket to expose the same and adapted when in register therewith to release the first said member.

6. The combination with a member to be rotated provided with a transverse notch, a second member provided with a socket to receive the first said member and having a transverse slot intersecting the socket and adapted to register with the notch, and an arm slidably adjustable in the slot and said notch, said arm having means to prevent its withdrawal from the member carrying it, and having a notch to permit the separation of the members.

In testimony whereof I affix my signature, in presence of two witnesses.

WILLIAM H. CLARKSON.

Witnesses:
L. M. THURLOW,
A. KEITHLEY.